Figure 1:
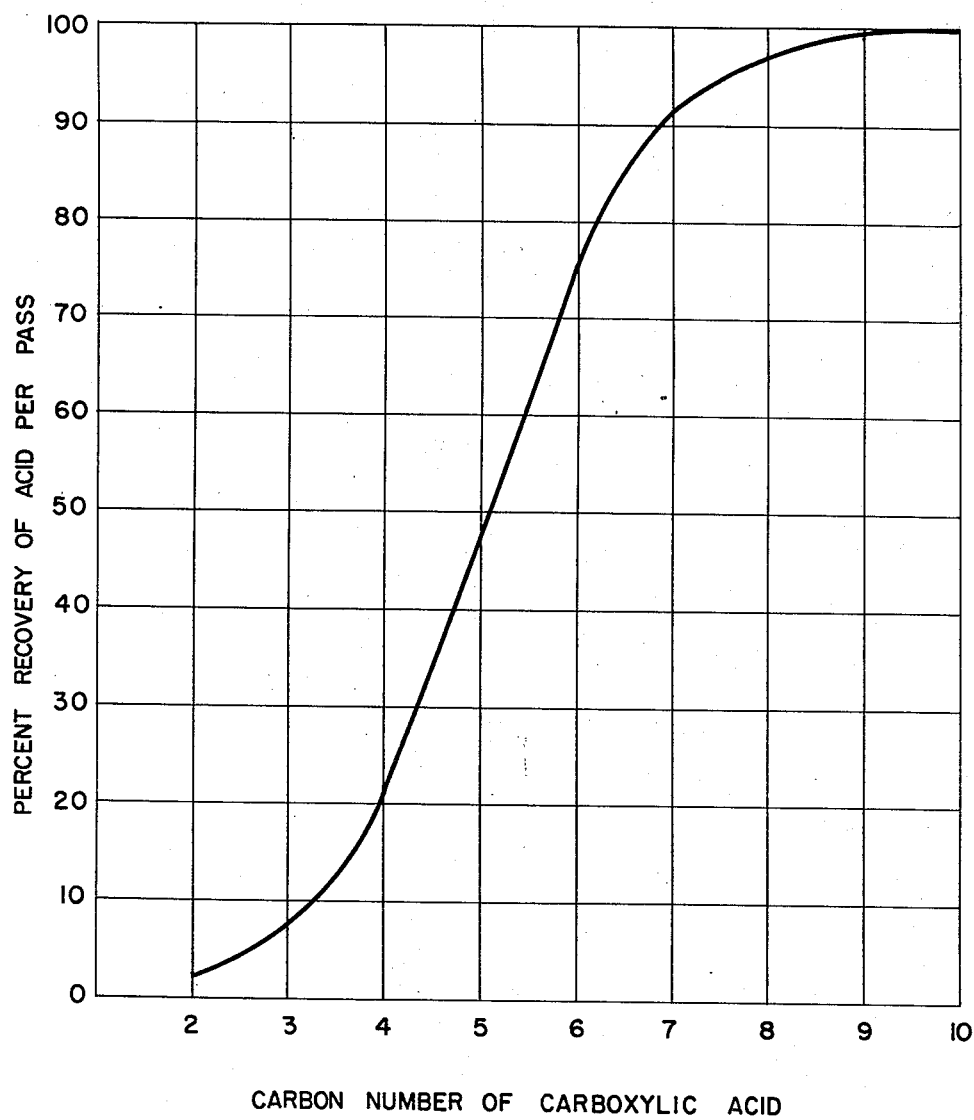

DONALD G. CAIN
CLIFFTON S. GODDIN, JR.
NEAL M. CARRUTHERS
INVENTORS

BY *Arthur McElwy*

ATTORNEY

Feb. 23, 1954  D. G. CAIN ET AL  2,670,366
PROCESS FOR REGENERATING CARBOXYLIC
ACIDS FROM THEIR SALTS
Filed Aug. 27, 1951  2 Sheets-Sheet 2

DONALD G. CAIN
CLIFFTON S. GODDIN, JR.
NEAL M. CARRUTHERS
INVENTORS

BY *Arthur McIlroy*
ATTORNEY

UNITED STATES PATENT OFFICE 2,670,366

PROCESS FOR REGENERATING CARBOXYLIC ACIDS FROM THEIR SALTS

Donald G. Cain, Clifton S. Goddin, Jr., and Neal M. Caruthers, Tulsa, Okla., assignors to Stanolind Oil and Gas Company, Tulsa, Okla., a corporation of Delaware Application August 27, 1951, Serial No. 243,862

16 Claims. (Cl. 260—450)

Our invention relates to an improved method for recovering carboxylic acids from complex mixtures thereof. More particularly, it pertains to a process for recovering a wide range of carboxylic acids from hydrocarbon mixtures thereof, for example, from the raw synthesis oil obtained by the reduction of carbon monoxide with hydrogen over an iron catalyst.

While the present invention obviously is applicable to the recovery of acids from numerous types of crude mixtures, this description will be confined largely to the use of such invention in connection with the recovery of carboxylic acids from the oil phase produced by the aforesaid hydrocarbon synthesis.

Previously, it was proposed to recover the acid components from the hydrocarbon synthesis oil by first adding a suitable base such as caustic, to the crude mixture to convert the acids contained therein to their corresponding salts. As a result of the neutralization step, an aqueous phase or layer containing the acids in the form of their dissolved salts and an oil layer were formed, the aqueous phase being withdrawn and non-acid impurities removed therefrom by means of distillation. This purified salt solution was then acidified with a suitable mineral acid, such as sulfuric acid, and the carboxylic acids liberated. The acid layer was then washed with water and thereafter further processed by distillation or other suitable means. Such a procedure for recovering carboxylic acids from mixtures of the above type, possesses the major disadvantage that it consumes substantial quantities of caustic, or other alkaline material, and mineral acid. Furthermore, a by-product salt solution is produced in the process which presents a disposal problem.

Other procedures for the recovery of carboxylic acids from solutions of their salts propose the use of gaseous carbon dioxide, which forms carbonic acid in aqueous solution, to replace the mineral acid. However, this procedure has been found to be inefficient for the recovery of carboxylic acids produced in hydrocarbon synthesis. This is particularly true with respect to the recovery of the low molecular weight water-soluble carboxylic acids, especially acetic, propionic, butyric and valeric acids, hereinafter referred to as light acids.

Accordingly, it is an object of our invention to provide a process whereby mixtures of carboxylic acids, including substantial proportions of the light water-soluble acids, can be continuously and completely recovered. This is in contrast to methods formerly available to the art which are batch or semi-continuous in nature, and do not accomplish any significant recovery of the light water-soluble acids. It is a further object of our invention to employ carbon dioxide in the liquid state in an amount in excess of the stoichiometric quantity required to liberate the aforesaid acids from their salts, and sufficient to function as a solvent for extracting the acids thus liberated. It is still a further object of our invention to provide a simple and efficient method for recovering all of the light acids, by continuously recycling salts of the light acids to the regeneration zone.

In general, the process of our invention involves first neutralizing the acids present in the raw synthesis oil stream with an aqueous solution of a suitable alkali metal carbonate or bicarbonate. The resulting salts separate into a lower aqueous layer which is sent to a stripping column where dissolved non acid chemical and hydrocarbon impurities are removed overhead leaving a clean solution of carboxylic acid salts. The latter is next subjected to countercurrent reaction and extraction with liquid carbon dioxide in a regeneration tower. The carbon dioxide is circulated at a rate substantially in excess of the amount required to liberate all of the acids present, for example, in quantities of at least about 8 times (by weight) the stoichiometric amount and preferably in quantities of about 15 times the stoichiometric value. The liberated acids are extracted and dissolved in the rising stream of liquid carbon dioxide and the resulting rich liquid carbon dioxide extract is thereafter subjected to a distillation operation whereby the free acids are separated from the carbon dioxide. The bottoms from this distillation consist essentially of free carboxylic acids.

The portion of light acid salts not regenerated by the carbon dioxide is preferably recycled back to the original neutralizing step. The procedure of continuously recycling the low molecular weight acid salts to the primary oil feed stream is regarded by us as an exceedingly simple and convenient solution to the problem of achieving essentially complete recovery of the light acids. When the above mentioned method of regenerating carboxylic acids with carbon dioxide was originally investigated, it was found that the light acids could not be completely recovered under the conditions employed and in fact no practical means was apparent as to how this recovery problem was to be solved. We have found, however, that by continuously recycling the unregenerated light acid salt fraction the concentration of these salts builds up in the recycle stream to a level such that a quantity of each acid corresponding to that entering with the primary oil feed is eventually forced into the liquid carbon dioxide phase. By employing the procedure generally outlined above, we are able to liberate and recover increased quantities of acids in a single pass and by the continuous method of our invention, involving recycling the unregenerated light acid salts, the entire quantity of carboxylic acids originally present in the crude feed can be recovered.

The amount of the light acid salt recycle stream returned to the original feed stream may vary widely and is a function of the composition of the feed stream. Thus, we have found that the higher the percentage of light acids in the primary oil, the greater the recycle must be in order to secure complete recovery of the acids. For example, we have found that within the range of conditions in which we desire to operate, acetic acid is recovered in the solvent liquid carbon dioxide to the extent of only 2.5 per cent per pass while propionic acid is recovered to the extent of 7.5 per cent per pass. For the majority of feed streams investigated by us, however, we have found that a weight ratio of from 0.6 to about 1.1 parts of the light acid recycle salts to 1 part of fresh feed acid salts is sufficient to enable us to secure substantially complete recovery of all acids entering the process.

The difficulty encountered in removing light acids by means of ordinary extraction with liquid carbon dioxide is evident from the graph shown in Fig. 1 and further points out the importance of recycling in making the overall recovery process a practical and efficient scheme. The data on which the curve in Fig. 1 is based were obtained by subjecting a 20 weight per cent solution of mixed carboxylic acid salts to a single stage extraction with a 0.8 weight ratio of liquid carbon dioxide at a temperature of about 72° F. and at a pressure of about 865 p. s. i. From this curve it is seen that the recovery of the acids by means of a single contact with liquid carbon dioxide drops off sharply as the carbon number of the acid decreases below 6. Thus, regeneration conditions which may provide very satisfactory recovery of the higher acids, can be entirely impractical from the standpoint of a process for recovery of the complete acid stream.

For example, if gaseous carbon dioxide, which exerts no solvent action, were employed, the recovery of light water-soluble acids per pass would be very low, and a prohibitively high recycle rate would be required to accomplish any significant regeneration of the light acids. Similarly, if only limited amounts of liquid carbon dioxide are employed as a solvent, then the per cent of light acids removed per pass becomes very low, and the recycle of light acid salts increases to an uneconomic proportion.

The liquid carbon dioxide regeneration step may be effected at temperatures ranging from slightly above the freezing point of the aqueous salt solution to not in excess of 88° F. which is the critical temperature of carbon dioxide. Pressures applicable when working within the aforesaid temperature range may vary from about 555 p. s. i. g. at about 40° F. to 1055 p. s. i. g. at 88° F. Ordinarily, however, temperatures of from about 70° to 85° F. and pressures of from about 850 to 1000 p. s. i. g. are preferred. The circulation of liquid carbon dioxide employed, as previously indicated, should be substantially in excess of the quantity required to liberate the acids by reaction with their corresponding salts. Specifically, such excess should be sufficient to supply adequate solvent action for the liberated acids. Usually, in order to satisfy this requirement, a weight ratio of liquid carbon dioxide to salt solution of at least about 0.5:1 should be employed. For the majority of the conditions investigated, we have found that a weight ratio of carbon dioxide to salt solution of about 0.8:1 is highly satisfactory.

The liquid carbon dioxide extract of acids is flashed under reduced pressure to remove the bulk of the carbon dioxide overhead. Ordinarily, the pressure employed at this stage of our process is 50–100 p. s. i. less than that used in the acid regeneration tower. After the bulk of carbon dioxide has been removed in this manner, the acids thus obtained still generally contain from about 15 to 25 weight per cent of carbon dioxide, which may be removed by further flashing the mixture at atmospheric pressure.

The concentration of the salt solution produced in the acid neutralization step can be varied rather widely. The concentration utilized, however, is largely controlled by two factors: the tendency of the alkali metal bicarbonate to precipitate when the salt solutions employed are too concentrated, and the desire to use concentrated salt solutions which favor a reduction in the volume of regenerator feed, recycle and liquid carbon dioxide circulation required for complete recovery of the acids. In order to satisfy these two requirements and still operate efficiently, we generally prefer to employ, in the case of sodium salts, a regenerator feed concentration of about 20 to 25 weight per cent. By using solutions in this concentration range no precipitate of sodium bicarbonate in the system is encountered and at the same time the volume of circulating solutions are not excessive. With other alkali metals employed, the optimum concentration of salt varies with the solubility of the corresponding bicarbonate in the aqueous recycle. For example, with potassium salts such as, for example potassium carbonate, a regenerator feed concentration of about 40 weight per cent can be utilized without the occurrence of a precipitate in the system. Generally, it may be said that any alkaline compound normally employed for neutralizing the aforesaid oil soluble acids in the mixtures of the above mentioned type is suitable for use as makeup in the neutralizing step of our invention. Thus, if desired, the alkaline compound need not release carbon dioxide on contact with neutralization of the oil soluble acids but may be a base such as sodium hydroxide or potassium hydroxide and the carbon dioxide makeup may be furnished from an independent source.

Although it is generally desirable to employ salt solutions of the above stated concentrations, it should be understood that the process of our invention is not limited thereto. Thus, while the amount of recycle is proportionately increased after concentration of the salt solution is decreased such solutions may be employed with good recovery of the light acids. Also, salt solutions of sufficiently high concentration to cause the resulting bicarbonate to precipitate on liberation of the acids may likewise be used by filtering under pressure the resulting aqueous slurry prior to recycling the unconverted light acid salt. The solid bicarbonate phase can be recovered and employed in a subsequent neutralization of additional crude acids.

Our invention may be further illustrated by the following specific examples:

*Example 1*

Figure 2:
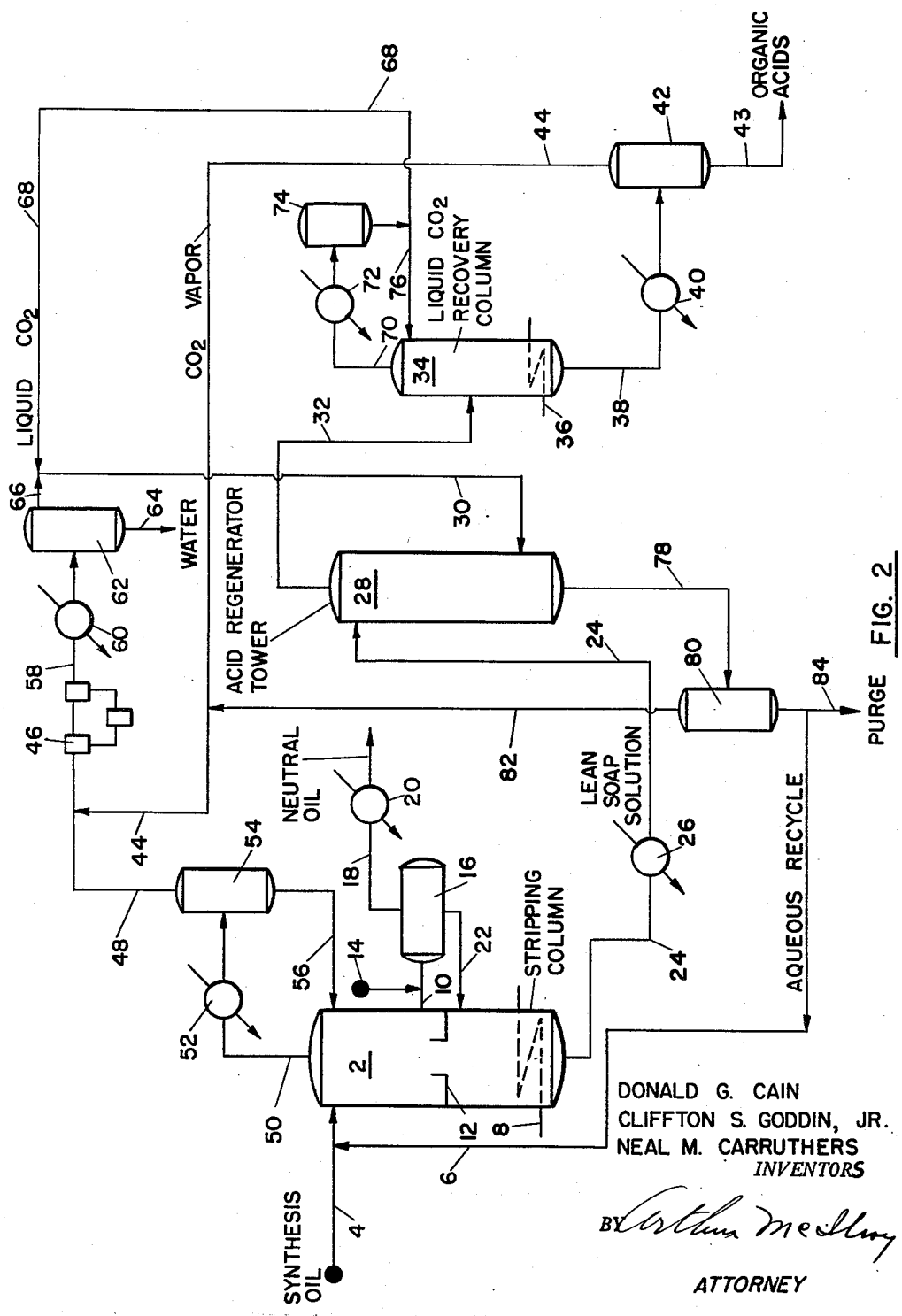

The attached flow sheet (Fig. 2) illustrates a preferred embodiment of our invention wherein 1000 gallons of primary synthesis oil containing 420 lbs. of carboxylic acids having an average molecular weight of 120, is added to a combination neutralizing and stripping column 2 through line 4. A total of 294 lbs. of sodium bicarbonate in aqueous solution is added to the primary oil stream via line 6 where it is mixed with the oil and introduced into the upper zone of column 2. This column is operated at a top tower temperature of about 170° F. and a bottoms temperature of about 230° F. Sufficient heat is supplied to reboiler 8 to not only thoroughly strip the impurities from the aqueous bottoms, but to strip out the carbon dioxide resulting from the reaction of bicarbonate with acids in the oil, thereby forcing the neutralization to completion. Separation of the resulting neutral oil from the aqueous salt solution is effected by withdrawing a side stream through line 10 located at a point slightly above chimney tray 12. Normally, about 2 to 5 per cent of the acids in the oil stream remain unneutralized by this treatment and are subsequently completely converted by adding a stoichiometric quantity of caustic through line 14. The neutral oil stream, which contains substantially all of the non acid chemicals, then flows through separator tank 16 where it is subsequently drawn off through line 18 and cooler 20 for further processing. The lower aqueous salt layer is returned to column 2 through line 22. Stripped acid salt in the form of a 20 weight per cent solution, free from non acid chemical and hydrocarbon impurities, is taken through line 24, cooled to about 75° F. in cooler 26 and thereafter introduced at a point near the top of acid regenerator tower 28. This tower is operated at a temperature and pressure of 75° F. and 900 p. s. i. g., respectively, and may contain conventional baffles and packing, or it may be mechanically agitated using either liquid carbon dioxide or aqueous salt solution as the continuous phase. Liquid carbon dioxide is added at a point near the bottom of tower 28 through line 30 in an amount corresponding to 0.8 part by weight for each part by weight of salt solution. Under these conditions the carboxylic acids are liberated, dissolved in excess liquid carbon dioxide and carried from the top of the tower through line 32. Thereafter this stream of carboxylic acids dissolved in liquid carbon dioxide is introduced into column 34 which is operated at 850 p. s. i. g. pressure and at a tower bottoms temperature of about 200° F. by means of heat supplied from reboiler 36. The hot stream of acids withdrawn from the tower through line 38, which contains from 15 to 20 weight per cent carbon dioxide, is cooled to about 120° F. in cooler 40 and then sent to flash tank 42, operated at atmospheric pressure, where a stream of crude acids amounting to 400 lbs. is withdrawn through line 43 and sent to a further refining step if desired. The carbon dioxide flashed from tank 42 is sent through line 44 to compressor 46 via line 48 where, together with carbon dioxide coming from the neutralization step in column 2, it is compressed to about 100 p. s. i. g.

The carbon dioxide resulting from the neutralization of the acids from the primary oil is taken from tower 2 through line 50 and cooled to 100° F. in cooler 52 after which it is sent to separator 54 where liquid hydrocarbons and water are collected and returned to the column as reflux through line 56. Carbon dioxide from compressor 46 flows through line 58 to cooler 60 where the temperature of the carbon dioxide is reduced to 70° F. The cooled liquid carbon dioxide then flows into separator 62 where condensation water is removed through line 64. Liquid carbon dioxide is taken off through line 66.

The carbon dioxide overhead vapor from column 34 is withdrawn through line 70 and condensed at 70° F. in condenser 72 after which it flows into separator 74. A portion of the liquid in separator 74 is returned as reflux to column 34 via line 76 while the balance is sent to acid regenerator 28 via lines 68 and 30 together with liquid carbon dioxide from line 66. The bottoms from the acid regenerator containing 6.7 weight per cent carbon dioxide, is removed through line 78 and sent to flash drum 80 which is maintained at atmospheric pressure. The flashed carbon dioxide vapor is returned to compressor 46 via lines 82 and 44 where it is compressed to about 1000 p. s. i. for recycle to the acid regenerator. The stream leaving the base of separator 80 consists essentially of an aqueous solution of sodium bicarbonate and salts, principally of $C_2$ to $C_5$ acids. Owing to the relatively low recovery of the lighter acids in liquid carbon dioxide, we generally prefer to purge about 2–5 per cent of the recycle stream through line 84. This tends to reduce the amount of recycle required for complete regeneration and recovery of the remaining acids. After purging, the resulting stream which contains 7 weight per cent sodium bicarbonate and 10 weight per cent light acid salts is returned to column 2 via line 6 for neutralization of free acids.

To demonstrate further the effectiveness of liquid carbon dioxide over gaseous carbon dioxide as an acid regenerating agent as well as an extractant for the liberated acids, the following example is included:

*Example II*

Two separate aqueous salt solutions, prepared by neutralizing the carboxylic acids contained in a conventional hydrocarbon synthesis oil with caustic solution, were diluted to a concentration of 14 weight per cent. The average molecular weight of the acids in these solutions was 118. The two solutions were placed in separate manually agitated pressure bombs having a capacity of 2 liters, after which liquid carbon dioxide was introduced into one bomb while gaseous carbon dioxide was added to the other. The bombs were then shaken until no further loss in pressure was observed. In the case of the liquid carbon dioxide, it was found that 58.3 mol per cent of the acids present in the original charge were liberated and recovered in the liquid carbon dioxide layer, while with gaseous carbon dioxide only 43.8 mol per cent of the acids in the feed were liberated and recovered. The conditions employed and the results obtained are summarized in the table below:

| Reaction Conditions | Gaseous $CO_2$ | Liquid $CO_2$ |
| --- | --- | --- |
| Pressure, p. s. i. g | 850 | 850 |
| Temperature, °C | 22–28 | 20–21 |
| Charge: | | |
|   Salt Solution, gms | 1,033 | 1,053 |
|   $CO_2$, gms | 288 | 845 |
| Acid Layer Product: | | |
|   Wt. recovered, gms | 73 | 88 |
|   Neutral equivalent | 160.4 | 143.5 |
|   Recovery, mol percent of charge | 43.8 | 53.3 |

From these data, it is seen that with liquid carbon dioxide as the regenerating agent and acid extractant, it is possible not only to recover the acids in substantially increased amounts over the recoveries possible with gaseous carbon dioxide but in addition, liquid carbon dioxide is capable of recovering more of the lighter acids than is possible with gaseous carbon dioxide, as evidenced from the neutral equivalents of the acids recovered in each instance.

It will be apparent to those skilled in the art to which the present invention relates that the latter is susceptible of numerous modifications without departing from the scope thereof. In general it may be said that our invention contemplates the use of liquid carbon dioxide both as an acid regenerating agent and as an extractant for the carboxylic acids liberated in such regeneration step.

What we claim is:

1. In a process for recovering carboxylic acids from a hydrocarbon solution thereof wherein said acids are converted to their corresponding alkali metal salts, separating the resulting aqueous salt solution and stripping off the volatile organic components thereof to obtain an aqueous residue of said salts, the steps which comprise subjecting said aqueous residue to extraction with liquid carbon dioxide while maintaining a temperature of from slightly above the freezing point of said aqueous residue to about 88° F. and a pressure of from about 555 to about 1055 p. s. i. g., said carbon dioxide being employed in a weight ratio of at least about 0.5 part of carbon dioxide to about 1 part of salt solution, and withdrawing a stream comprising liquid carbon dioxide and liberated carboxylic acids dissolved in said liquid carbon dioxide.

2. In a process for recovering carboxylic acids from an aqueous solution of their corresponding alkali metal salts, the steps which comprise subjecting said aqueous solution to extraction with liquid carbon dioxide while maintaining a temperature of from slightly above the freezing point of said aqueous residue to about 88° F. and a pressure of from about 555 to about 1055 p. s. i. g., said carbon dioxide being employed in a weight ratio of at least about 0.5 part of carbon dioxide to about 1 part of salt solution, and withdrawing a stream comprising liquid carbon dioxide and liberated carboxylic acids dissolved in said liquid carbon dioxide.

3. The process of claim 2 in which the acids to be recovered are in the form of their sodium salts and the salt solution employed ranges in concentration of from about 20 to 25 weight per cent.

4. The process of claim 2 in which the temperature employed ranges from about 70° to about 85° F. and the pressure employed ranged from about 850 to 1000 p. s. i. g.

5. In a process for recovering carboxylic acids from an aqueous solution of their corresponding sodium salts, the steps which comprise subjecting an aqueous solution containing said sodium salts in a concentratiion of from about 20 to about 25 weight per cent to extraction with liquid carbon dioxide while maintaining a temperature of from about 70° to about 85° F. and a pressure of from about 850 to 1000 p. s. i. g., said carbon dioxide being employed in a weight ratio of at least about 0.5 part of carbon dioxide to about 1 part of salt solution, and withdrawing a liquid stream of carbon dioxide containing liberated carboxylic acids dissolved therein.

6. The process of claim 5 in which sodium bicarbonate is employed to neutralize said acids in an amount sufficient to yield an aqueous salt solution having a concentration of from about 20 to about 25 weight per cent.

7. In a process for recovering carboxylic acids from a hydrocarbon solution thereof wherein said acids are converted to their corresponding alkali metal salts, separating the resulting aqueous salt solution and stripping off the volatile organic components thereof to obtain an aqueous residue of said salts, the steps which comprise neutralizing said acids with an alkaline compound selected from the group consisting of alkali metal carbonates and bicarbonates, heating the resulting mixture to obtain gaseous effluent comprising carbon dioxide, withdrawing a liquid fraction comprising an aqueous solution of alkali metal carboxylic acid salts, thereafter contacting the latter with liquid carbon dioxide at a temperature above the freezing point of said salt solution while maintaining said carbon dioxide in the liquid phase, said liquid carbon dioxide being employed in a weight ratio of at least about 0.5 part to 1 part of said salt solution, and recovering a fraction comprising liquid carbon dioxide and regenerated carboxylic acids dissolved in said liquid carbon dioxide.

8. The process of claim 7 in which sodium bicarbonate is the alkali metal bicarbonate employed and the concentration of the aqueous salt solution from which the carboxylic acids are liberated contains from about 20 to about 25 weight per cent carboxylic acid sodium salts.

9. The process of claim 7 in which potassium bicarbonate is the alkali metal bicarbonate employed.

10. In a process for recovering carboxylic acids from a hydrocarbon solution thereof wherein said acids are converted to their corresponding alkali metal salts, separating the resulting aqueous salt solution and stripping off the volatile organic components thereof to obtain an aqueous residue of said salts, the steps which comprise neutralizing said acids with an alkaline compound selected from the group consisting of alkali metal carbonates and bicarbonates, heating the resulting mixture to obtain a gaseous effluent comprising carbon dioxide, withdrawing a liquid fraction comprising an aqueous solution of alkali metal carboxylic acid salts, thereafter contacting the latter with liquid carbon dioxide while maintaining a temperature above the freezing point of said salt solution but not in excess of 88° F. and a pressure of from about 555 to about 1055 p. s. i. g., said carbon dioxide being employed in a weight ratio of at least 0.5 part of carbon dioxide to 1 part of salt solution, and recovering a fraction comprising liquid carbon dioxide and regenerated carboxylic acids dissolved in said liquid carbon dioxide.

11. In a process for recovering carboxylic acids, including low molecular weight water soluble acids from a hydrocarbon solution thereof, the steps which comprise introducing into a stripping column said hydrocarbon solution together with a sufficient quantity of an alkali metal bicarbonate to substantially completely neutralize said acids, heating the resulting mixture to take overhead a vaporous product consisting principally of carbon dioxide, withdrawing as bottoms an aqueous solution of carboxylic acids salt formed by the neutralization of said acids, thereafter converting said salts into their corresponding carboxylic acids by mixing liquid carbon dioxide with said salt solution while maintaining said carbon dioxide in the liquid phase, said carbon dioxide being employed in a weight ratio of at least about 0.5 part of carbon dioxide to about 1 part of salt solution, withdrawing a liquid stream of carbon dioxide containing liberated carboxylic acids, recovering an aqueous solution consisting essentially salts of said low molecular weight acids and alkali metal bicarbonate, and recycling the aqueous salt solution thus recovered to a new charge of hydrocarbon solution containing oil soluble carboxylic acids, and repeating the above cycle.

12. The process of claim 11 in which the vaporous overhead product from the neutralization step, consisting principally of carbon dioxide, is compressed to a pressure of from about 555 to about 1055 p. s. i. to produce a liquid carbon dioxide fraction, which fraction is thereafter utilized to liberate and extract said acids from their aqueous salt solution.

13. The process of claim 11 in which the hydrocarbon solution of carboxylic acids employed is derived from a conventional hydrocarbon synthesis involving the reduction of carbon monoxide with hydrogen.

14. In a process of recovering carboxylic acids from a hydrocarbon solution thereof, the steps which comprise introducing into a stripping column said hydrocarbon solution together with a sufficient quantity of an alkali metal bicarbonate to substantially completely neutralize said acids, heating the resultant mixture to take overhead a vaporous product consisting principally of carbon dioxide, withdrawing as bottoms an aqueous solution of carboxylic acid salts formed by the neutralization of said acids, thereafter converting said salts into their corresponding carboxylic acids by mixing liquid carbon dioxide with said salt solution while maintaining said carbon dioxide in the liquid phase, said carbon dioxide being employed in a weight ratio of at least about 0.5 part of carbon dioxide to about 1 part of salt solution, and withdrawing a stream comprising liquid carbon dioxide and liberated carboxylic acids dissolved therein.

15. In a continuous process for recovering carboxylic acids, including low molecular weight water soluble carboxylic acids, from an aqueous solution of their corresponding alkali metal salts (1), the steps which comprise subjecting said aqueous solution to extraction with liquid carbon dioxide while maintaining a temperature of from slightly above the freezing point of said aqueous solution to about 88° F. and a pressure of from about 555 to about 1055 p. s. i. g., said carbon dioxide being employed in a weight ratio of at least about 0.5 part of carbon dioxide to about 1 part of said salt solution, withdrawing an aqueous phase comprising low molecular weight carboxylic acid salts, recycling a major portion of said aqueous phase to a new charge of alkali metal salts (1) and repeating the above cycle.

16. The process of claim 1 in which the hydrocarbon solution of carboxylic acids employed is derived from a conventional hydrocarbon synthesis involving the reduction of carbon monoxide with hydrogen.

DONALD G. CAIN.
CLIFTON S. GODDIN, Jr.
NEAL M. CARUTHERS.

References Cited in the file of this patent

UNITED STATES PATENTS

| Number | Name | Date |
|---|---|---|
| 1,946,419 | Woodruff et al. | Feb. 6, 1934 |
| 2,232,331 | Leithe et al. | Feb. 18, 1941 |